US009927301B2

(12) United States Patent
Peterson (10) Patent No.: US 9,927,301 B2
(45) Date of Patent: Mar. 27, 2018

(54) DETECTOR LENS

(71) Applicants: Bosch Security Systems, Inc., Fairport, NY (US); Robert Bosch GmbH, Stuttgart (DE)

(72) Inventor: Craig Peterson, Penfield, NY (US)

(73) Assignees: Bosch Security Systems, Inc., Fairport, NY (US); Robert Bosch GmbH, Stuttgart (DE)

( * ) Notice: Subject to any disclaimer, the term of this patent is extended or adjusted under 35 U.S.C. 154(b) by 60 days.

(21) Appl. No.: 14/922,834

(22) Filed: Oct. 26, 2015

(65) Prior Publication Data

US 2017/0115164 A1    Apr. 27, 2017

(51) Int. Cl.
| G01J 5/02 | (2006.01) |
| G01J 5/00 | (2006.01) |
| G01J 5/04 | (2006.01) |
| G01J 5/08 | (2006.01) |

(52) U.S. Cl.
CPC ........... *G01J 5/0205* (2013.01); *G01J 5/0022* (2013.01); *G01J 5/04* (2013.01); *G01J 5/0806* (2013.01)

(58) Field of Classification Search
CPC .................................. G01J 5/04; G01J 5/0875
See application file for complete search history.

(56) References Cited

U.S. PATENT DOCUMENTS

| 4,604,524 A | 8/1986 | Kotlicki et al. |
| 4,795,908 A | 1/1989 | Morimoto et al. |
| 5,282,118 A | 1/1994 | Wade |
| D628,103 S | 11/2010 | Schmalz et al. |
| D661,212 S | 6/2012 | DeLeon et al. |
| D666,512 S | 9/2012 | Gresko et al. |
| 8,455,831 B2 | 6/2013 | Santos et al. |
| 2016/0169743 A1* | 6/2016 | Buckley .................... G01J 5/08 250/338.3 |

FOREIGN PATENT DOCUMENTS

| DE | 4207112 A1 | 9/1993 |
| EP | 0844595 A2 | 10/1997 |

OTHER PUBLICATIONS

Lyric Security and Home Control System Brochure: http://yourhome.honeywell.com/en/products/security-alarm-solutions/lyric-security-and-home-control-system.
PCT International Search Report for PCT/EP2016/073944 dated Dec. 15, 2016 (6 pages).

* cited by examiner

*Primary Examiner* — Kenneth J Malkowski
(74) *Attorney, Agent, or Firm* — Kelly McGlashen; Maginot Moore & Beck LLP (57) ABSTRACT

A motion sensor housing includes a base and a lens holder that is supported on the base. The motion sensor is disposed in the housing between the base and the lens holder so as to face the lens holder, and a frameless lens is supported on an outer surface of the lens holder in such a way that the lens provides the outermost surface of the housing. In addition, when the motion sensor housing is viewed facing the lens, the lens holder is not visible, and the outward-facing surface of the lens is free of edges, borders and/or discontinuities.

19 Claims, 9 Drawing Sheets

DETECTOR LENS

BACKGROUND

1. Field of the Invention

The present invention relates to a motion detection device, and, more particularly, to a motion detection device using a passive infrared (PIR) motion sensor supported in an unobtrusive housing.

2. Description of the Related Art

It is known that all objects transmit a level of infrared light that varies with the temperature of the object. Taking advantage of this characteristic, passive infrared (PIR) motion sensors are used as motion detectors to detect motion of a relatively warm body that emits a relatively high level of infrared radiation, such as a human intruder or motor vehicle. If the level of infrared radiation in the vicinity of the motion detector changes by a predetermined amount, then the motion detector produces an output signal. The output signal indicates that the motion detector has sensed the motion of a warm body. In an environmental control system, the output signal may be used to trigger turning on of a light. In a security system, the output signal may be used to trigger an alarm indicating the presence of an intruder.

The PIR motion sensor is supported within a detector housing that is typically mounted on a wall of a room that is to be monitored, for example in an upper corner of the room. It is desirable to provide a detector housing that has an unobtrusive appearance.

SUMMARY

In some aspects, a detection device includes a housing including a base, a lens holder that is supported on the base, and a sensor disposed in the housing between the base and the lens holder. The detection device also includes a lens that is supported on the lens holder in such a way that the lens holder is not visible when the detection device is viewed facing the lens along a line normal to an outward-facing surface of the lens.

The detection device may include one or more of the following features: The lens encloses a peripheral edge of the base and overlies the sensor, whereby a peripheral edge of the base is not visible when the detection device is viewed facing the lens along a line normal to an outward-facing surface of the lens. The lens holder is disposed between the sensor and the lens, and the lens holder includes an opening that is aligned with the sensor whereby infrared radiation passing through the lens and the opening can be detected by the sensor. The lens outward-facing surface is free of surface features including discontinuities, height changes, joints, edges, grooves, protrusions, and apertures. The lens outward-facing surface is free of frames and support members. The lens includes a focusing region formed integrally with a supporting region in such a way that the outward-facing surface of the lens defines a curved, smoothly continuous surface in which a boundary between the focusing region and the support region is visually indistinguishable when the detection device is viewed facing the outward-facing surface of the lens. A sensor-facing surface of the lens in the focusing region is formed having surface features configured to direct infrared radiation toward the sensor. The surface features are arranged to form a Fresnel lens. A lens thickness in the focusing region is non-uniform, where the lens thickness corresponds to the distance between the outward-facing surface and the sensor-facing surface. A lens thickness in the support region is greater than a maximum thickness of the lens in the focusing region where the lens thickness corresponds to the distance between the outward-facing surface and the sensor-facing surface. The support region at least partially surrounds the focusing region. A lens-facing surface of the lens holder is arcuate. The shape of the lens is conformed to the shape of the lens holder. The lens includes a pair of ribs that protrude inward from a sensor-facing surface of the lens, each rib having a first surface configured to engage the lens holder, and a second surface that is opposed to the first surface. The second surface is configured to engage the base. The base comprises a bottom that is parallel to a plane and a sidewall that surrounds a periphery of the bottom, and an orthogonal projection of the lens onto the plane has a greater area than an area of an orthogonal projection of the base onto the plane.

In some aspects, a housing is configured to support an electronic component. The housing includes a base and a cover assembly that is supported by the base. The cover assembly includes a lens that provides the outermost surface of the cover assembly, the lens having an outward-facing surface, and an electronic component-facing surface that is opposed to the outward-facing surface. The cover assembly also includes a lens holder that supports the lens via the electronic component-facing surface of the lens so that the lens is retained in a predetermined position relative to the base and the outward-facing surface is free of support members and surface features so as to be uniformly smooth and continuous.

The housing may include one or more of the following features: The lens surrounds a periphery of the lens holder such that the lens holder is not visible when the housing is viewed facing the lens along a line normal to an outward-facing surface of the lens. The lens includes a rib that extends along a portion of a peripheral edge of the lens, wherein the rib surrounds, and is configured to engage, a portion of a peripheral edge of the lens holder. The housing includes an electronic component assembly disposed between the base and the cover assembly, wherein the electronic component assembly includes the electronic component arranged to face the lens, and the lens holder includes an opening aligned with the electronic component so as to permit infrared radiation passing through the lens to reach the electronic component. The electronic component is a sensor configured to detect electromagnetic radiation. The electronic component-facing surface of the lens has a focusing region that includes surface features configured to direct light in a predetermined direction. The lens thickness in the focusing region is variable, where the lens thickness corresponds to the distance between the outward-facing surface and the electronic component-facing surface. The surface features of the focusing region are arranged to form a Fresnel lens. The lens includes a support region that at least partially surrounds the focusing region, the support region having a uniform thickness that is greater than the maximum thickness of the focusing region. The focusing region is formed integrally with the support region in such a way that a boundary between the focusing region and the support region is visually indistinguishable when the housing is viewed facing the lens. The lens includes a transmission region that is surrounded by the support region and spaced apart from the focusing region, the transmission region having a thickness that is less than that of the support region. The base comprises a bottom that is parallel to a plane and a sidewall that surrounds a periphery of the bottom, and an orthogonal projection of the lens onto the plane has a greater area than an area of an orthogonal projection of the base onto the plane.

A motion detection device includes a PIR motion sensor supported within a housing. The housing includes a tray-like base and a front assembly having a cover assembly that closes an open end of the base. The cover subassembly includes a lens that forms an outermost surface of the motion detection device and that is supported solely on its sensor-facing surface such that when the motion detection device is viewed in front plan view, the lens forms the entirety of the visible surface of the motion detection device. That is, the lens is secured to the base via a lens holder that supports the lens via the lens sensor-facing surface. An outward-facing surface of the lens is free of support members such as would be provided by a frame. As a result, the lens is frameless, and forms the front-facing surface of the motion detection device while presenting no visible surface features to a room occupant. Specifically, the visible surface of the cover assembly, which corresponds to the outward-facing surface of the lens, is free of edges, borders and/or discontinuities.

In addition, the lens includes a Fresnel lens portion that overlies the PIR motion sensor and directs infrared radiation toward the PIR motion sensor. In particular, the Fresnel lens portion is formed on a portion of the sensor-facing surface of the lens. This configuration provides a lens outward-facing surface that is uniformly smooth and has minimal shadow lines and joints.

By providing a lens that is supported on its sensor facing surface and by providing the Fresnel lens portion on the sensor-facing surface of the lens, the outward-facing surface of the lens is a smooth, continuous curve that is free of edges, borders and/or discontinuities. As a result, the motion detector has a clean, unobtrusive appearance that permits the motion detector to blend in with its surroundings. This can be compared to some conventional detector housings in which a lens that directs infrared radiation toward the sensor is supported in the housing cover. In such conventional housings, the lens may be a thin molded polyethylene part overlapped by a rigid frame that forms a lens window in the cover. As a result, the frame edges may highlight the joint between the lens and the cover, and generate shadow lines that are noticeable to room occupants.

The lens holder is formed of material that is more rigid than the material used to form the lens, and serves as a curved scaffold that gives the lens a curved shape. The sensor-facing surface of the lens includes snap features that surround and engage side edges of the lens holder. The snap features retain the lens on the outward-facing surface of the lens holder. In addition, since the snap features surround the side edges of the lens holder, the lens holder is fully obstructed from the view of the room occupant.

DETAILED DESCRIPTION

Referring to FIGS. 1-4, a motion detection device 1 uses a passive infrared (PIR) motion sensor 7 to detect motion of a warmth-emitting body, such as a human intruder or motor vehicle. Upon detection of a predetermined level of infrared radiation in the vicinity of the PIR motion sensor 7, the motion detection device 1 provides an output signal that can be used to trigger a subsequent action by an environmental and/or security control system. For example, a detected motion may trigger a light switch, an alarm signal, or other application. The PIR motion sensor 7 is supported within a detector housing 2. The housing 2 is typically mounted on a wall of a room that is to be monitored, for example in an upper corner of the room. The housing 2 includes lens 60 that serves as an outer cover of the housing and directs infrared radiation to the PIR motion sensor 7. The lens 60 is frameless and overlies supporting portions of the housing 2, so that when viewed in front plan view (FIG. 3), the motion detection device 1 has a clean, unobtrusive appearance that permits the motion detection device 1 to blend in with its surroundings.

Figure 5:
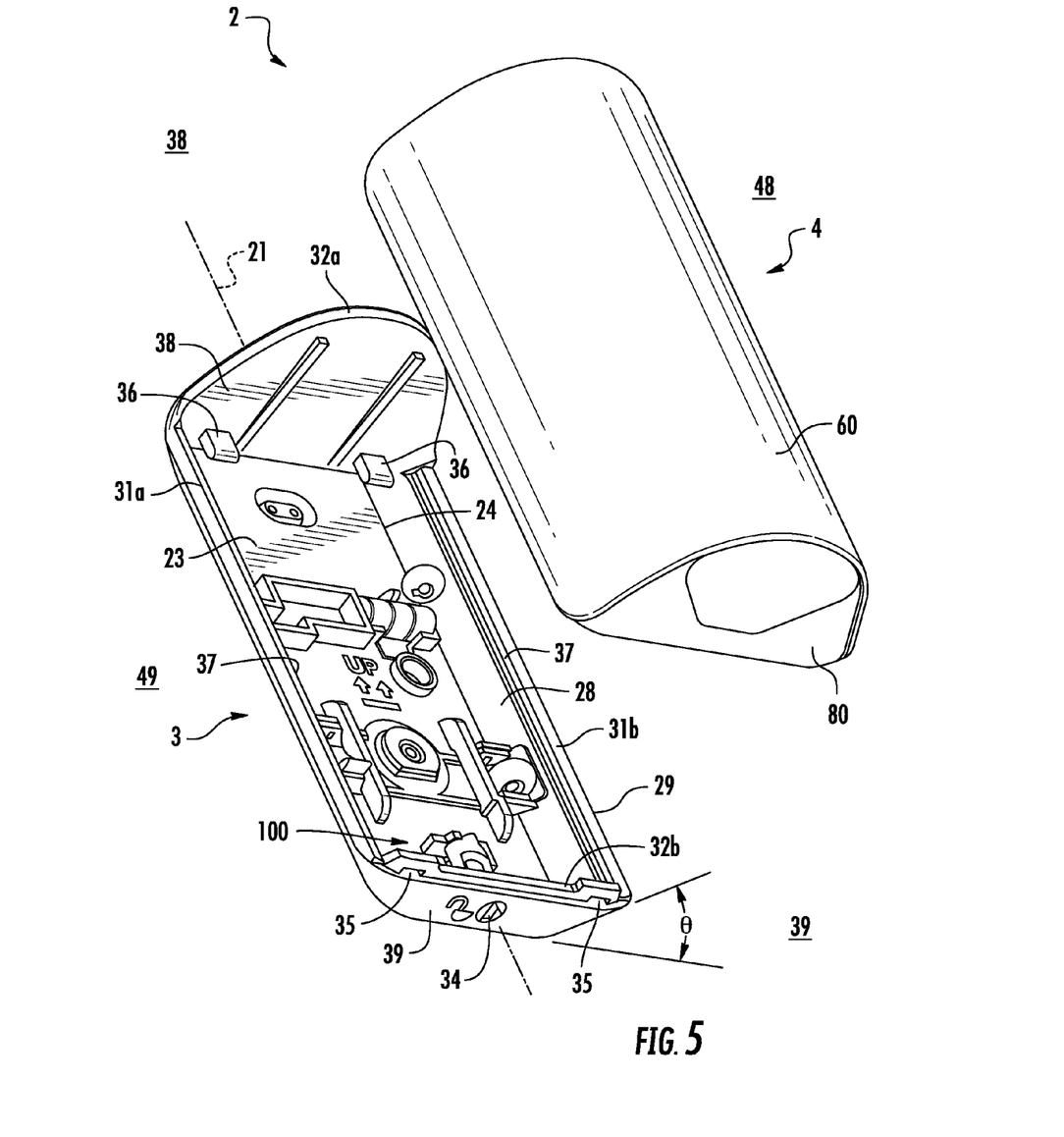
FIG. 5 is an exploded perspective view of the front assembly and the base that form the motion detection device housing as seen from the front and bottom of the device.

Referring to FIG. 5, the housing 2 includes a front assembly 4 that includes the PIR motion sensor 7 and the lens 60 that directs infrared radiation to the PIR motions sensor 7. The housing 2 also includes a base 3 used to mount the front assembly 4 to a support surface such as a wall (not shown). The front assembly 4 is selectively detachable from the base 3 to permit detector maintenance such as battery replacement, as discussed further below.

The base 3 is a tray-like member that includes a generally planar bottom 23 and a base sidewall 28 that surrounds the periphery 24 of the bottom 23. In the illustrated embodiment, the bottom periphery 24 is generally rectangular, and the base 3 includes a longitudinal axis 21 that is parallel to the long sides of the rectangular bottom 23. Correspondingly, the sidewall free end 29 includes a pair of long edges 31a, 31b that extend in parallel to the longitudinal axis 21, and a pair of short edges 32a, 32b that join, and extend transversely to, the long edges 31a, 31b. One of the short edges 32a corresponds to a first, or top, end 38 of the housing assembly 2, and the opposed short edge 32b corresponds to a second, or bottom, end 39 of the housing assembly 2. The terms "top" and "bottom", as well as the terms "front" (indicated by reference number 48) and "rear" (indicated by reference number 49), are used with reference to the orientation shown in FIG. 1, which corresponds to one of many possible orientations of the motion detection device 1 when in use.

At each of the first end 38 and second end 39 of the base, the sidewall 28 extends in a direction that is generally normal to the bottom 23. The portions of the sidewall 28 extending between the first and second ends 38, 39 extend at an angle θ (FIG. 5) relative to the bottom 23 such that a free end 29 of the base sidewall 28 circumscribes a larger area than does the bottom periphery 24. For example, in some embodiments, the base sidewall 28 extends at an angle θ of about 45 degrees relative to the bottom 23 along the long edges 31a, 31b.

A circular port 34 is formed in the base sidewall 28 at the first end 38 of the base 3. The port is configured to receive a portion of a locking mechanism 100 used to secure the front assembly 4 to the base 3.

In addition, a slot 37 is formed in the base sidewall 28 adjacent, and in parallel, to each of the sidewall long edges 31. The slots 37 extend from the base first end 38 to the base second end 39, and are shaped and dimensioned to receive a rail 126 that protrudes along a portion of the front assembly 4, as discussed further below. The front assembly 4 is supported above the bottom 23 via the rails 126 such that a vacancy 40 (FIG. 10) exists between the front assembly 4 and the bottom 23. The locking mechanism 100 is disposed within this vacancy 40 adjacent to the first end 38 of the base 3.

The base 3 includes features that retain the front assembly 4 in an assembled position in which the front assembly 4 closes the open end of the base 3. For example, in the illustrated embodiment, a pair of retaining hooks 36 are provided on the sidewall 28 of the base first end 38. The retaining hooks 36 are spaced apart in a direction parallel to the short edge 32a, and protrude in parallel to the bottom 23. The retaining hooks 36 are configured to engage with retaining eyes 130 (FIG. 4) provided on the front assembly 4, as discussed further below. In addition, a pair of retaining eyes 35 are provided on the short edge 32a of the base first end 38. The retaining eyes 35 protrude perpendicularly to the bottom 23. The retaining eyes 35 are configured to engage with retaining hooks 88 provided on the front assembly 4, as discussed further below.

Figure 6:
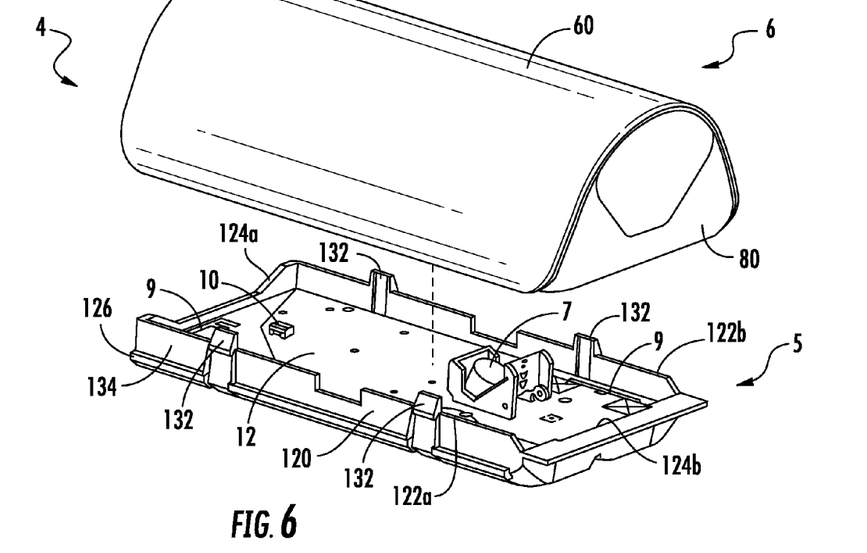
FIG. 6 is an exploded perspective view of the front assembly of FIG. 5 as seen from the front and bottom of the device.
Figure 7:
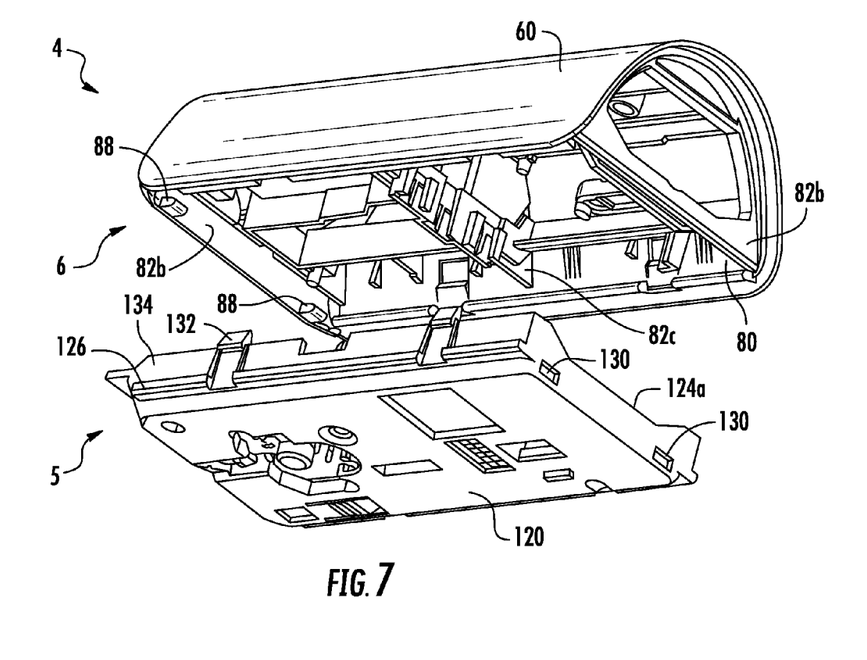
FIG. 7 is an exploded perspective view of the front assembly of FIG. 5 as seen from the rear and top of the device.

Referring to FIGS. 6 and 7, the front assembly 4 includes two subassemblies that are snap-fit together. In particular, the front assembly 4 includes a sensor subassembly 5 and a cover subassembly 6.

Figure 8:
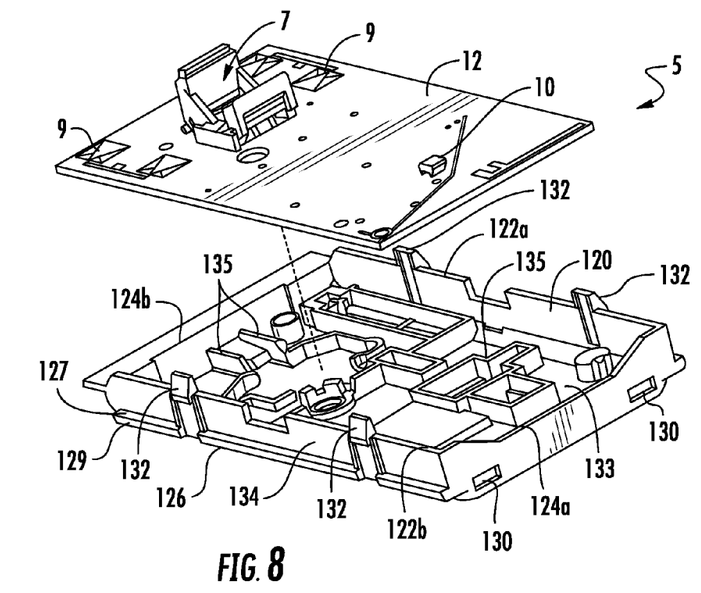
FIG. 8 is an exploded perspective view of the sensor subassembly as seen from the front and top of the device.
Figure 9:
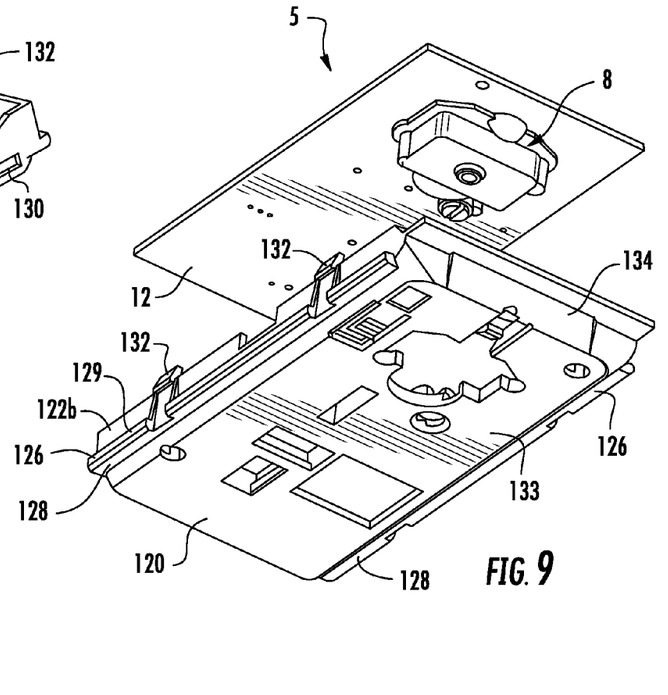
FIG. 9 is an exploded perspective view of the sensor subassembly as seen from the rear and bottom of the device.
Figure 10:
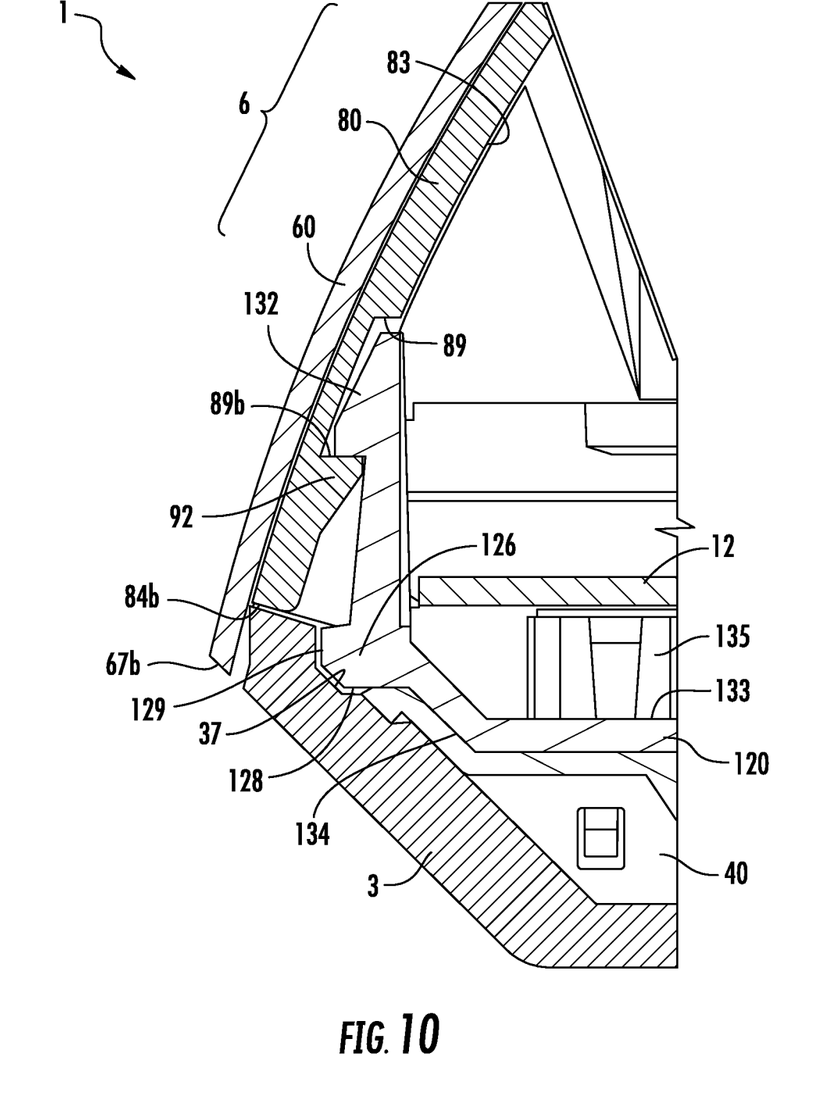
FIG. 10 is an enlarged, cross-sectional view of a portion of the housing as seen along line B-B of FIG. 4.

Referring to FIGS. 8-10, the sensor subassembly 5 includes a printed circuit board (PCB) 12 and a PCB holder 120 that supports the PCB 12. The PCB 12 is used to support PIR motion sensor 7 and electrically interconnect it with other electronic components that control and power the PIR motion sensor 7. In some embodiments, the PCB 12 supports and provides electrical interconnections for one or more additional electronic components. For example, such electronic components may include an additional sensor such as a microwave sensor 8 and associated antennas 9, and a light emitting diode (LEDs) 10 used to indicate device status.

The PCB holder 120 is configured to support the PCB 12 within the base 3, and includes a platform 133 that is surrounded by a holder sidewall 134. The peripheral shape of the platform 133 is rectangular to correspond to the shape of the base bottom 23, whereby the holder sidewall 134 includes a pair of long edges 122a, 122b that are joined by a pair of short edges 124a, 124b.

The holder sidewall 134 includes a rail 126 adjacent each PCB holder long edge 122a, 122b that protrudes outward in a direction generally parallel to the bottom 23. Each rail 126 is shaped and dimensioned to be received within a corresponding slot 37 formed in the base sidewall 28. In particular, an end face 129 and bottom-facing surface 128 of each rail 126 is disposed within the corresponding slot 37. As discussed further below, the front assembly 4, which is supported via the rails 126, slides in a longitudinal direction along the slots 37 during assembly and disassembly of the front assembly 4 with the base 3.

The holder sidewall 134 includes retaining features that retain the front assembly 4 in an assembled position in which the front assembly 4 closes the open end of the base 3. In particular, a pair of spaced-apart retention eyes 130 are formed adjacent one of the short edges 124a. The retention eyes 130 are spaced apart, and are sized and dimensioned to receive retaining hooks 36 provided on the base 3. The retention eyes 130 cooperatively engage with the retaining hooks 36. This feature, in combination with the locking mechanism 100, serves to retain the sensor subassembly 5, and thus also the front assembly 4, in an assembled configuration relative to the base 3, as discussed further below.

In addition, the holder sidewall long edges 122a, 122b each include a pair of longitudinally spaced snaps 132 that are configured to engage with corresponding recesses 89 (FIG. 10) formed in the cover subassembly 6, as discussed further below. The snaps 132 snap into and cooperatively engage with the recesses 89 to connect the PCB holder 120, and thus also the sensor subassembly 5, to the cover subassembly 6 via a snap connection to form the front assembly 4. In the front assembly 4, the cover subassembly 6 is connected to the sensor subassembly 5 on a side of the sensor subassembly 5 that is opposed to the base 3.

To form the assembled sensor subassembly 5, the PCB 12 is received within the PCB holder 120. The PCB 12 is disposed within the PCB holder 120 so as to abut, and be surrounded by, the holder sidewall 134. In addition, the PCB 12 rests spaced above the platform 133 on the standoffs 135 that project from the platform 133.

Figure 11:
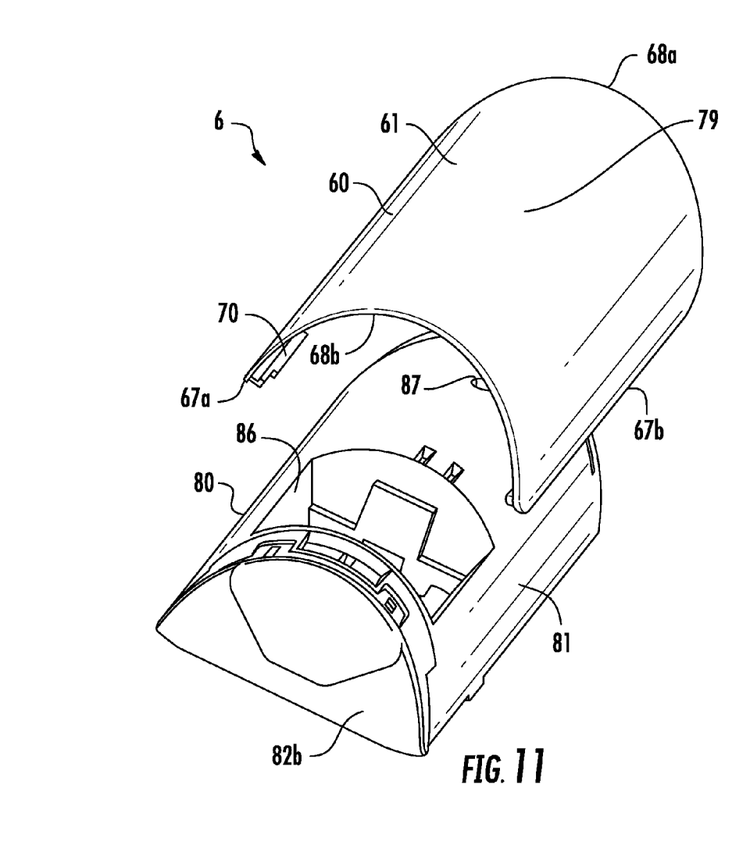
FIG. 11 is an exploded perspective view of the cover subassembly as seen from the front and bottom of the device.
Figure 12:
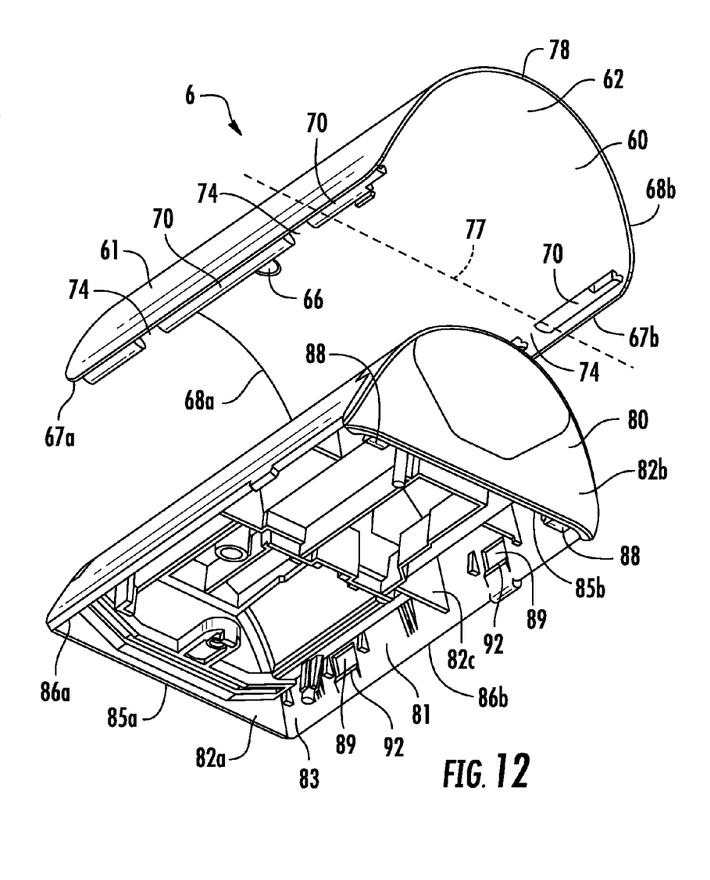
FIG. 12 is an exploded perspective view of the cover subassembly as seen from the rear and bottom of the device.
Figure 13:
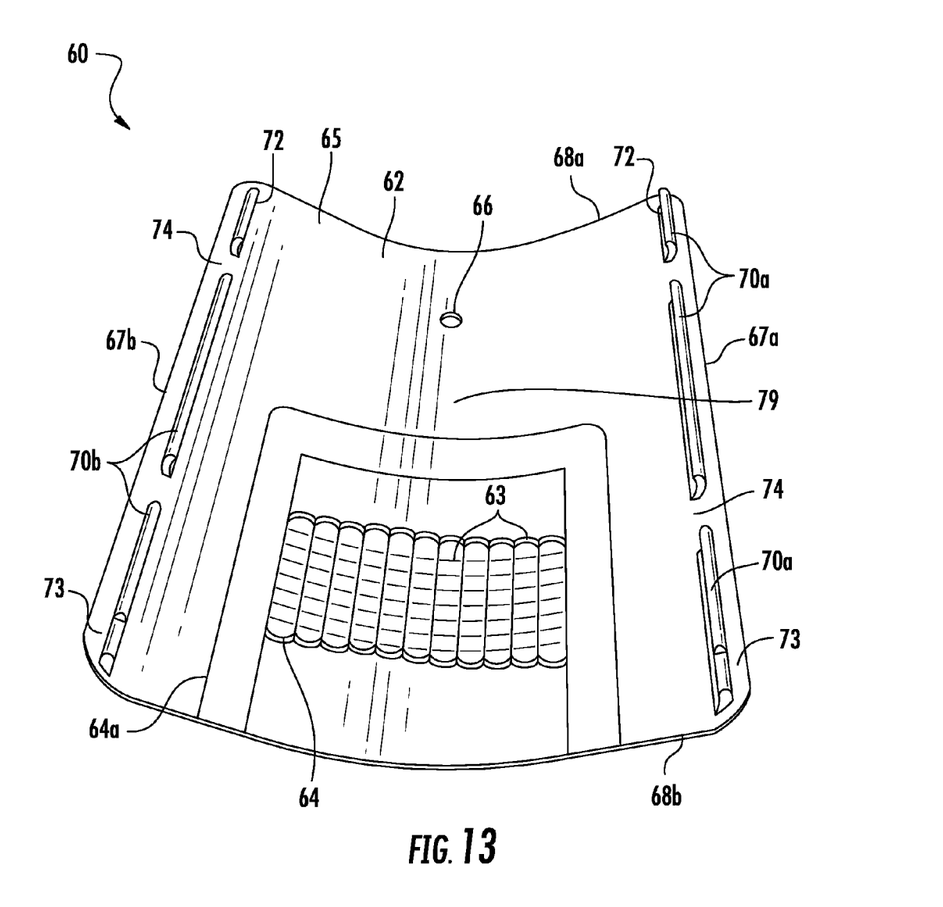
FIG. 13 is a detail view of the sensor-facing surface of the lens.

Referring to FIGS. 11-13, the cover subassembly 6 includes a lens holder 80 and a lens 60 that is supported on the lens holder 80. The lens holder 80 underlies and supports a sensor-facing surface 62 of the lens 60, as discussed further below.

Figure 1:
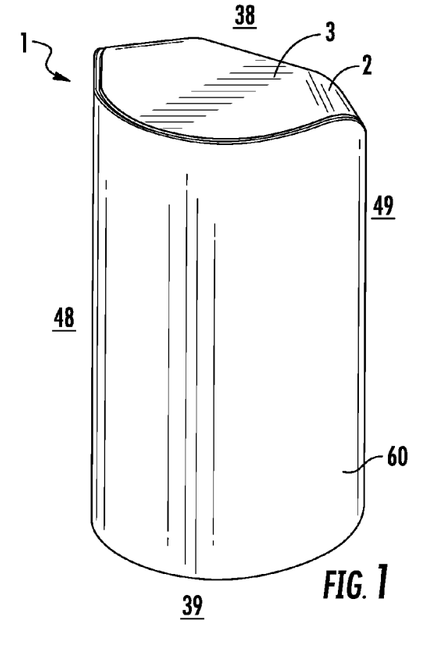
FIG. 1 is a perspective view of a motion detection device as seen from the front and top of the device.
Figure 2:
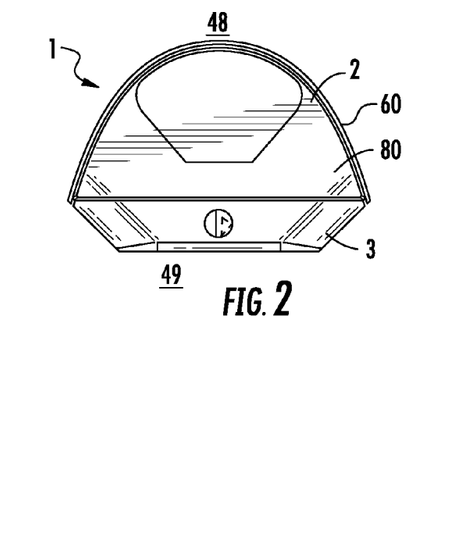
FIG. 2 is a bottom plan view of the motion detection device of FIG. 1.
Figure 3:
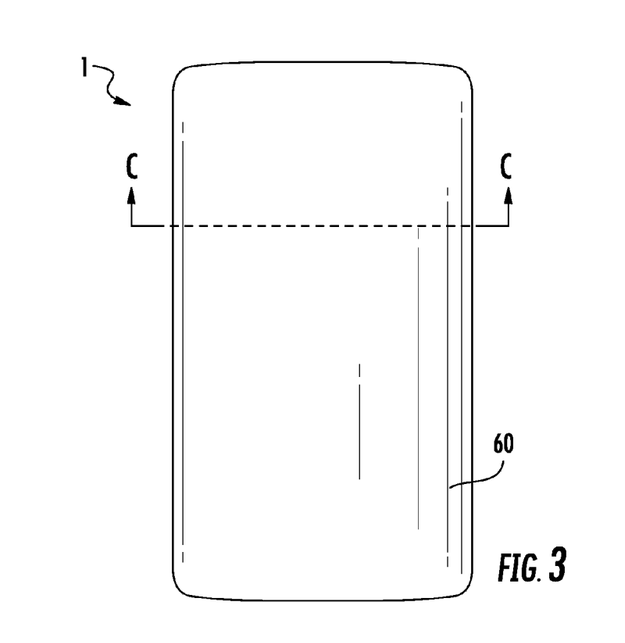
FIG. 3 is a front plan view of the motion detection device of FIG. 1
Figure 4:
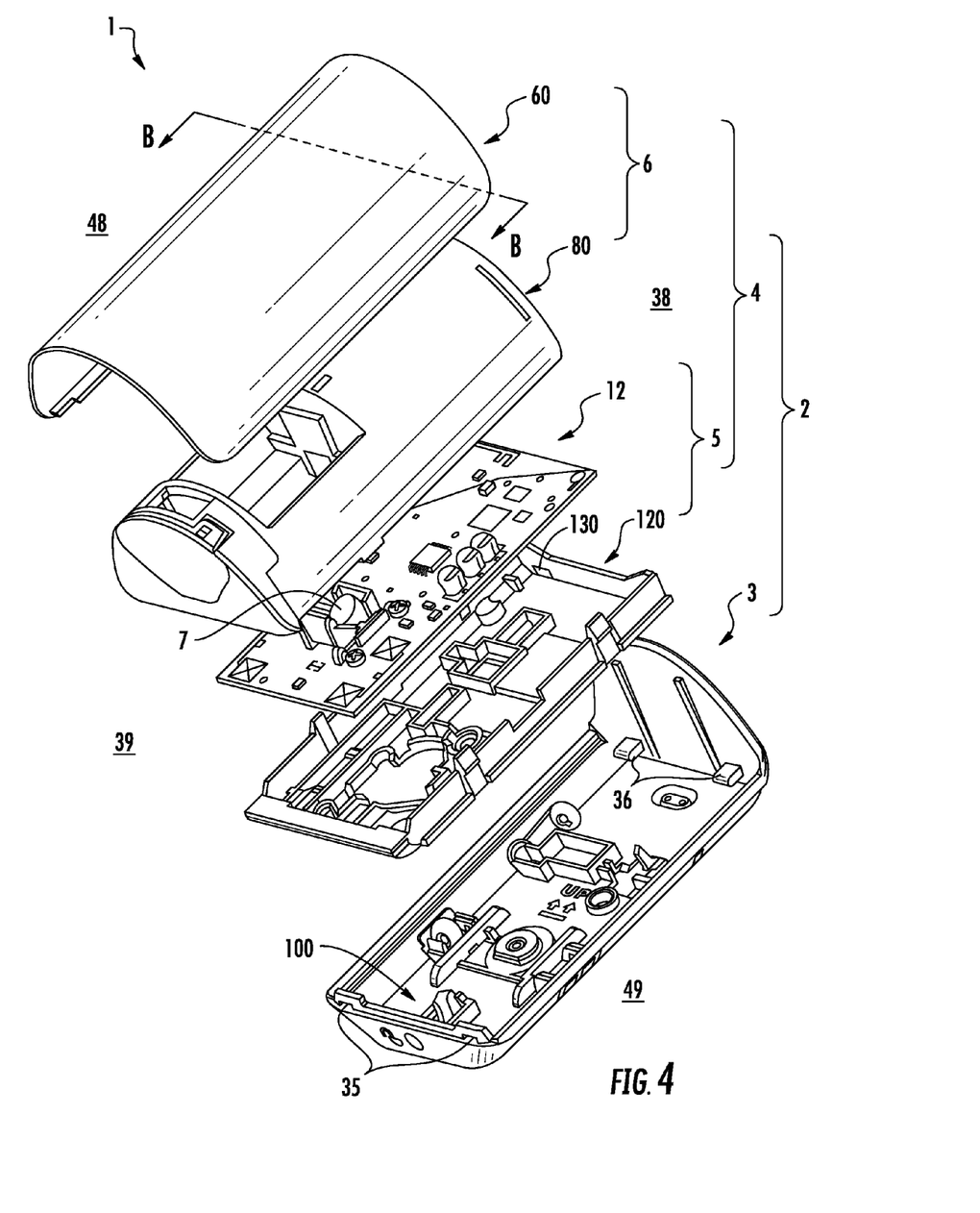
FIG. 4 is an exploded perspective view of the motion detection device of FIG. 1 as seen from the front and bottom of the device.

The lens 60 is a curved, plate shaped element in which the peripheral edge includes a pair of linear long edges 67a, 67b, and a pair of curved short edges 68a, 68b that join, and extend generally transversely to, the long edges 67a, 67b. As a result, the lens 60 has a generally rectangular profile when viewed facing the lens 60 (e.g., in front plan view as seen in FIG. 3). In addition, the lens 60 has an arcuate profile when viewed facing the bottom 39 (e.g., in bottom plan view as seen in FIG. 2). For example, the mid portion 78 of the lens 60 is spaced apart from a line 77 that passes through the long edges 67a, 67b of the lens element 60. The lens 60 includes the sensor-facing surface 62, and an outward-facing surface 61 that is opposed to the sensor-facing surface 62.

The lens 60 is thin. In particular, the thickness of the lens 60 is very small relative to the dimensions of the lens 60 along the long edges 67a, 67b and short edges 68a, 68b. As used here, the term lens thickness corresponds to the distance between the outward-facing surface 61 and the sensor-facing surface 62.

The lens 60 includes a focusing region 64 formed integrally with a support region 65 in such a way that the outward-facing surface 61 defines a curved, uniformly smooth and continuous surface. In particular, when the lens 60 is viewed in front plan view (see FIG. 3), the boundary 64a between the focusing region 64 and the support region 65 is visually indistinguishable. To this end, the lens outward-facing surface 61 is smooth and free of visible surface features including discontinuities, height changes, joints, edges, grooves, ridges or other protrusions, apertures, etc. In some embodiments, it may also be free of surface features such as texture, embossing, etc.

The sensor-facing surface 62 of the lens 60 (best seen in FIG. 13) includes surface features 63 that define the focusing region 64 and are configured to collect light and direct it toward the PIR sensor 7. As a result, the lens thickness in the focusing region 64 is variable. In some embodiments, the surface features 63 include curved facets arranged to form a Fresnel lens that directs light toward the PIR sensor 7. The surface features 63 may be formed, for example, in a molding process.

The focusing region 64 is arranged on the sensor-facing surface so as to overlie the PIR sensor 7. In the illustrated embodiment, the PIR sensor 7 is located at a position that is offset from a longitudinal center 79 of the motion detection device 1. For example, although the PIR sensor 7 is positioned along the longitudinal axis 21, which is parallel to, and midway between, the lens long edges 67a, 67b, the PIR sensor 7 is positioned closer to one short edge 68b (for example, the bottom short edge 68b) than the opposed short edge 68a (in this example, the top short edge 68a). Due to the offset position of the PIR sensor 7 relative to the longitudinal center 79 of the motion detection device 1, the focusing region 64 is also offset from the longitudinal center 79 of the motion detection device 1. In the illustrated embodiment, the focusing region 64 is a rectangular region that extends between a longitudinal center 79 of the lens and the bottom short edge 68b. As used here, the term longitudinal center 79 refers to a midpoint between the top short edge 68a and the bottom short edge 68b. The focusing region 64 is centered on the longitudinal axis and is spaced apart from the long edges 67a, 67b of the lens 60.

Thus, the focusing region 64 is surrounded on three sides by the support region 65. The support region 65 has a uniform thickness that is greater than the maximum thickness of the focusing region 64. The particular thickness for these regions 64, 65 will depend on the properties of the material used to form the lens 60. For example, it has been determined that for a lens 60 formed of polyethylene, a maximum lens thickness to permit sensing is about 0.6 mm. Thus, for a lens 60 formed of polyethylene, the support region 65 has a thickness in a range of about 0.8 to 1.0 mm, as compared to a maximum thickness of about 0.6 mm in the focusing region 64. A support region thickness of about 0.8 mm is sufficiently thick to permit manufacturing and to adequately support the focusing region 64, while being sufficiently thin to permit deformation of the lens 60 into the desired curved shape.

The lens 60 may also include a relatively small, circular transmitting region 66 disposed along the longitudinal axis at a location between the longitudinal center 79 of the lens and the top short edge 68a. The transmitting region 66 overlies an indicator LED mounted on the PCB 12 that may be used to indicate whether the PIR sensor 7, or other sensors mounted on the PCB 12, are in an active detection state. Like the focusing region 64, the transmitting region 66 is thin relative to the support region 65 that surrounds it to permit the desired intensity of light to be transmitted through the lens 60. For a lens 60 formed of polyethylene, the transmitting region 66 may have a thickness in a range of about 0.3 mm to 0.5 mm.

The lens 60 includes a first rib 70a that protrudes from the sensor-facing surface 62 adjacent the first long edge 67a, and a second rib 70b that protrudes from the sensor-facing surface 62 adjacent the second long edge 67b. The first and second ribs 70a, 70b extend in parallel with the first and second long edges 67a, 67b. The first and second ribs 70a, 70b are slightly spaced apart from the respective first and second long edges 67a, 67b, whereby an interior corner 73 is defined between the first rib 70a and the first long edge 67a and between the second rib 70b and the second long edge 67b. The ribs 70a, 70b are not longitudinally continuous since they contain gaps 74 through which the PCB holder snaps 132 pass through during assembly.

Figure 14:
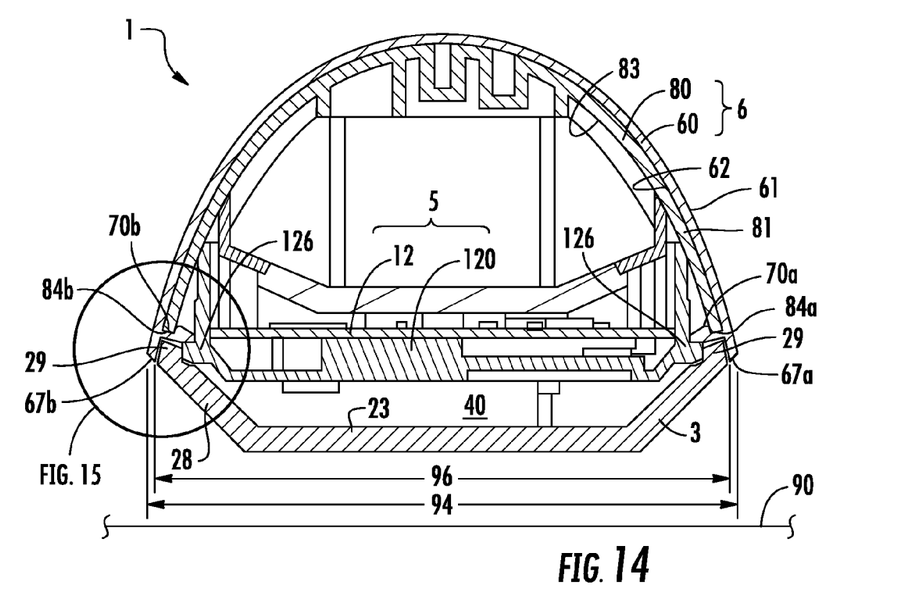
FIG. 14 is a cross-sectional view of the housing as seen along line C-C of FIG. 3.
Figure 15:
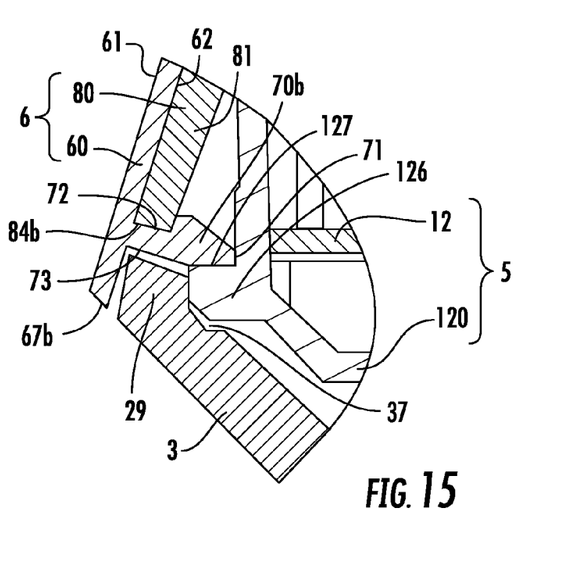
FIG. 15 is a detail cross-sectional view of a portion of the housing labelled as A in FIG. 14.

Referring to FIGS. 14 and 15, the first and second ribs 70a, 70b are each formed having a groove 72 shaped and dimensioned to receive a portion of the peripheral edge of the lens holder 80, as discussed further below. The groove 72 is located on a surface of the rib 70a, 70b that faces away from the respective interior corner 73. Thus, the sensor-facing surface 62 of the lens 60 is supported by the lens holder 80 in such a way that the lens holder 80 is obstructed from view when the motion detection device 1 is viewed in front plan view. In addition, the first and second ribs 70a, 70b are of sufficient length that the rib free ends 71 are supported on a cover facing surface 127 of a corresponding rail 126 of the PCB holder 120, as discussed further below.

Referring to FIGS. 10-12, the lens holder 80 includes a curved plate 81 reinforced by connecting transverse trusses 82a, 82b, 82c formed on a PCB-facing surface 83 of the curved plate 81. The PCB-facing surface 83 has a rectangular profile, and includes long edges 84a, 84b that are joined at each end of the lens holder 80 via short edges 85a, 85b that correspond to end trusses 82a, 82b. The curved plate 81 and trusses 82a, 82b, 82c define compartments that receive the PIR sensor 7, battery packs (not shown), etc. In addition, the curved plate 81 includes a relatively large opening 86 adjacent one end truss 82b that permits radiant energy to pass through lens holder 80 to the PIR sensor 7 disposed on the PCB 12, and a relatively small opening 87 between the large opening and the opposed short edge 85a that overlies the indicator LED disposed on the PCB 12 and permits radiant energy to pass from the indicator LED to pass through the lens holder 80.

The arcuate shape of the lens holder 80 gives the lens 60 its corresponding arcuate shape. In addition, the lens holder 80 reinforces and stabilizes the arcuate shape of the lens 60. To this end, the lens holder 80 is provided in a material that is more rigid than the material used to form the lens 60. For example, if the lens 60 is formed of polyethylene, the lens holder 80 may be formed of acrylonitrile butadiene styrene (ABS).

The lens holder 80 includes retaining hooks 88 formed on one end truss 82b. The retaining hooks 88 are rectangular tabs that protrude inward in a direction parallel to the longitudinal axis 21, and are configured to engage with retaining eyes 35 formed on the base 3. The engagement of the lens holder retaining hooks 88 with the base retaining eyes 35 serves to retain the front assembly 4 in an assembled position relative to the base 3 when used in conjunction with other retaining features, as discussed further below.

The lens holder 80 includes a pair of longitudinally-spaced recesses 89 formed on the PCB-facing surface 83 of the curved plate 81 at a location adjacent each long edge

84*a*, 84*b*. The recesses 89 are positioned to correspond to the location of the snaps 132 formed on the PCB holder sidewalls 134. The recesses 89 have a rectangular shape to correspond to the rectangular shape of the snaps 132. The curved plate 81 is thickened along an edge of each recess 89 that is closest and parallel to the corresponding long edge 84*a*, 84*b*, forming a ridge 92 that enhances engagement of the snap 132 with a respective recess 89.

Referring again to FIGS. 14 and 15, to form the assembled cover subassembly 6, the lens 60 overlies the curved plate 81 of the lens holder 80 with the lens sensor-facing surface 62 facing the curved plate 81. In addition, the long edges 84*a*, 84*b* of the lens holder 80 are received within a corresponding longitudinally extending groove 72 of the lens ribs 70*a*, 70*b*. Since each of the long edges 84*a*, 84*b* of the lens holder 80 is disposed in a corresponding groove 72, the long edges 84*a*, 84*b* are enclosed by the lens 60 and its ribs 70*a*, 70*b*. As a result, the lens holder 80 is not visible when the motion detection device 1 is viewed in front plan view. In addition, the lens 60 covers the sidewall free ends 29, whereby the sidewall free ends 29 are not visible in any view of the motion detection device 1. In particular, the sidewall short edges 32*a*, 32*b* and long edges 31*a*, 31*b* face the lens sensor facing surface 62 such that an orthogonal projection 94 of the lens 60 onto a plane 90 that is parallel to the base bottom 23 has a greater area than an area of an orthogonal projection 96 of the base 3 on the plane 90.

To form the assembled front assembly 4, the cover subassembly 6 (e.g., the lens 60 supported on the lens holder 80) is assembled with the sensor subassembly 5 (e.g., the PCB 12 supported on the PCB holder 120) with the PCB holder snaps 132 in engagement with the lens holder recesses 89, whereby the cover subassembly 6 is retained on the sensor subassembly 5.

In addition, when the cover subassembly 5 is assembled with the sensor subassembly 6, the rails 126 of the PCB holder 120 are disposed in the slots 37 of the base 3, the base sidewall free ends 29 along the long edges 31*a*, 31*b* are positioned in the corresponding interior corner 73 defined between the lens long edge 67*a*, 67*b* and the corresponding rib 70*a*, 70*b*, and the base sidewall free ends 29 along the short edges 32*a*, 32*b* underlie the lens 60. Thus, the lens 60 overlies the free ends 29 of the base sidewall 28, whereby the base 3 is not visible when the motion detection device 1 is viewed from the front.

When the cover subassembly 6 is assembled with the sensor subassembly 5 by engaging the PCB holder snaps 132 with the lens holder recesses 89, the free ends 71 of the lens ribs 70*a*, 70*b* rest on the cover-facing surface 127 of the rails 126 of the PCB holder 120. Since the PCB holder snaps 132 retain the lens holder 80 in the assembled position relative to the PCB holder 120, the free ends 71 of the lens ribs 70*a*, 70*b* are prevented from deflection, whereby the lens holder long edges 84*a*, 84*b* are securely retained within the grooves 72, and thus the lens 60 is securely retained on the lens holder 80.

When the housing 2 is assembled, the front assembly 4, which includes the cover subassembly 6 connected to the sensor subassembly 5, is mounted on the base 3 such that the sensor subassembly 5 is disposed between the cover subassembly 6 and the base 3. The retaining features 35, 36, 88, 130 are used in combination with the locking mechanism 100 in order to retain the front assembly 4 in connection with the base 3. In particular, the rails 126 of the PCB holder 120 of the front assembly 4 are supported within the slots 37 of the base 3 while the base retaining eyes 35 are engaged with the lens holder retaining hooks 88 and the base retaining hooks 36 are engaged with the PCB holder retaining eyes 130. To engage or disengage the retaining eyes 35, 130 and hooks 36, 88, the front assembly 4 is slid longitudinally relative to the base 3 along the slots 37. Once the retaining eyes 35, 130 and hooks 36, 88 are engaged, the front assembly 4 is prevented from reverse sliding along the base slots 37 to a disengaged position by the locking mechanism 100.

The housing assembly 2 includes the cover subassembly 6 that includes the lens 60 which is supported on the sensor-facing surface 62 in such a way that the lens holder 80 is not seen in front plan view. In addition, the lens 60 is formed in such a way that the outward-facing surface 61 of the lens 60 is smooth, continuous and without visible surface features so as to provide a motion detection device 1 having cover surface that is frameless, and has minimal shadow lines and joints on the cover. As a result, the motion detector device 1 has a clean, unobtrusive appearance that permits the motion detector device 1 to blend in with its surroundings.

Although the housing 2 is described herein as part of a motion detection device 1 that supports a passive infrared (PIR) motion sensor 7, the housing is not limited to supporting a PIR motion sensor and the device is not limited to motion sensing. For example, the housing can support other types of electronic components including other types of sensors, and/or may include illumination sources, where the electronic component is arranged to face the lens 60, and to receive and/or transmit electromagnetic radiation through the lens.

In the illustrated embodiment, the base 3 includes a generally elongated rectangular bottom 23, whereby the front view profile of the motion detection device 1 has a generally elongated rectangular shape (FIG. 3). However, the shape of the base 3 and the front view profile of the motion detection device are not limited to an elongated rectangular shape, and possible alternative shapes include square, pentagonal or other polygonal shapes, as well as shapes having curved sides.

The housing assembly 20 includes retaining elements that retain the front assembly 4 in a closed position relative to the base 3. As previously described, the base 3 includes retaining eyes 35 and retaining hooks 36 that engage with corresponding retaining eyes 130 and retaining hooks 88 provided on the front assembly 4. However, it is understood that the type and placement of retaining elements described herein are non-limiting, whereby a different arrangement of retaining eyes and retaining hooks can be employed. In addition, or alternatively, other types of retaining elements can be employed.

In the illustrated embodiment, the focusing region 64 has a generally rectangular shape and the transmitting region 66 has a generally circular shape. However, the focusing region 64 and the transmitting region 66 are not limited to the illustrated shapes. For example, the focusing region 64 may have a curved shape such as a circular or oval shape, and/or the transmitting region 66 may have a polygonal shape such as a triangular or square shape.

Selective illustrative embodiments of the device are described above in some detail. It should be understood that only structures considered necessary for clarifying the device have been described herein. Other conventional structures, and those of ancillary and auxiliary components of the device, are assumed to be known and understood by those skilled in the art. Moreover, while a working example of the device has been described above, the device is not limited to the working example described above, but various design alterations may be carried out without departing from the device as set forth in the claims.

What is claimed is:

1. A detection device comprising
    a housing including a base and a lens holder that is supported on the base,
    a sensor disposed in the housing between the base and the lens holder, and
    a lens that is supported on the lens holder in such a way that the lens holder is not visible when the detection device is viewed facing the lens along a line normal to an outward-facing surface of the lens,
wherein the lens includes a pair of ribs that protrude inward from a sensor-facing surface of the lens, each rib having
    a first surface including a groove that receives an edge of the lens holder, and
    a second surface that is opposed to the first surface, the second surface configured to abut a portion of the base.

2. The detection device of claim 1, wherein the lens encloses a peripheral edge of the base and overlies the sensor, whereby a peripheral edge of the base is not visible when the detection device is viewed facing the lens along a line normal to an outward-facing surface of the lens.

3. The detection device of claim 1, wherein the lens holder is disposed between the sensor and the lens, and the lens holder includes an opening that is aligned with the sensor whereby light passing through the lens and the opening can be detected by the sensor.

4. The detection device of claim 1, wherein the lens outward-facing surface is free of surface features including discontinuities, height changes, joints, edges, grooves, protrusions, and apertures.

5. The detection device of claim 1, wherein the lens outward-facing surface is free of frames and support members.

6. The detection device of claim 1, wherein the lens includes a focusing region formed integrally with a supporting region in such a way that the outward-facing surface of the lens defines a curved, smoothly continuous surface in which a boundary between the focusing region and the support region is visually indistinguishable when the detection device is viewed facing the outward-facing surface of the lens.

7. The detection device of claim 6, wherein a sensor-facing surface of the lens in the focusing region is formed having surface features configured to direct light toward the sensor.

8. The detection device of claim 6, wherein a lens thickness in the focusing region is non-uniform, where the lens thickness corresponds to the distance between the outward-facing surface and the sensor-facing surface.

9. The detection device of claim 6, wherein a lens thickness in the support region is greater than a maximum thickness of the lens in the focusing region where the lens thickness corresponds to the distance between the outward-facing surface and the sensor-facing surface.

10. The detection device of claim 1, wherein the shape of the lens is conformed to the shape of the lens holder.

11. The detection device of claim 1, wherein the lens includes a pair of ribs that protrude inward from a sensor-facing surface of the lens, each rib having
    a first surface configured to engage the lens holder, and
    a second surface that is opposed to the first surface, the second surface configured to engage the base.

12. The detection device of claim 1, wherein
    the base comprises a bottom that is parallel to a plane and a sidewall that surrounds a periphery of the bottom, and
    an orthogonal projection of the lens onto the plane has a greater area than an area of an orthogonal projection of the base onto the plane.

13. A housing configured to support an electronic component, the housing comprising a base and a cover assembly that is supported by the base, wherein
    the cover assembly includes
        a lens that provides the outermost surface of the cover assembly, the lens having an outward-facing surface, and an electronic component-facing surface that is opposed to the outward-facing surface,
        a lens holder that supports the lens via the electronic component-facing surface of the lens so that the lens is retained in a predetermined position relative to the base and the outward-facing surface is free of support members and surface features so as to be uniformly smooth and continuous, and
        the lens surrounds a periphery of the lens holder such that the lens holder is not visible when the housing is viewed facing the lens along a line normal to an outward-facing surface of the lens,
wherein the lens includes a pair of ribs that protrude inward from a sensor-facing surface of the lens, each rib having
    a first surface including a groove that receives an edge of the lens holder, and
    a second surface that is opposed to the first surface, the second surface configured to abut a portion of the base.

14. The housing of claim 13, wherein the lens includes a rib that extends along a portion of a peripheral edge of the lens, wherein the rib surrounds, and is configured to engage, a portion of a peripheral edge of the lens holder.

15. The housing of claim 13, further comprising an electronic component assembly disposed between the base and the cover assembly, wherein the electronic component assembly includes the electronic component arranged to face the lens, and the lens holder includes an opening aligned with the electronic component so as to permit light passing through the lens to reach the electronic component.

16. The housing of claim 15, wherein the electronic component is a sensor configured to detect electromagnetic radiation.

17. The housing of claim 13, wherein the electronic component-facing surface of the lens has a focusing region that includes surface features configured to direct light in a predetermined direction.

18. The housing of claim 17, wherein the lens thickness in the focusing region is variable, where the lens thickness corresponds to the distance between the outward-facing surface and the electronic component-facing surface.

19. The housing of claim 13, wherein
    the base comprises a bottom that is parallel to a plane and a sidewall that surrounds a periphery of the bottom, and
    an orthogonal projection of the lens onto the plane has a greater area than an area of an orthogonal projection of the base onto the plane.

* * * * *